United States Patent [19]

Chivens et al.

[11] Patent Number: 4,522,221

[45] Date of Patent: Jun. 11, 1985

[54] TIMED FLOW CONTROL VALVE ASSEMBLY

[75] Inventors: Donald R. Chivens, Northridge; Paul Greskovics, Manhattan Beach; Edward C. Kelm, Pasadena, all of Calif.

[73] Assignee: Autarkic Flow Controls, Los Angeles, Calif.

[21] Appl. No.: 523,711

[22] Filed: Aug. 15, 1983

[51] Int. Cl.$^3$ .............................................. E04H 3/20
[52] U.S. Cl. ............................... 137/118; 137/624.14; 137/625.5
[58] Field of Search ............... 137/119, 118, 115, 495, 137/625.5, 624.14, 624.13, 624.11, 624.22

[56] References Cited

U.S. PATENT DOCUMENTS

| | | | |
|---|---|---|---|
| 1,739,787 | 12/1929 | Doughty et al. | 137/624.13 |
| 3,032,044 | 5/1962 | Pansini | 134/111 |
| 3,779,269 | 12/1973 | Gould | 137/119 |
| 3,785,391 | 1/1974 | Miller | 137/119 |
| 3,822,754 | 7/1974 | Henkin et al. | 239/240 |
| 3,972,344 | 8/1976 | Chauvigne | 137/119 |
| 3,989,222 | 11/1976 | Yoshiyasu | 251/130 |
| 4,029,119 | 6/1977 | Klieves | 137/119 |
| 4,086,933 | 5/1978 | Pansini | 137/119 |
| 4,092,995 | 6/1978 | Stubenruss | 137/119 |
| 4,313,455 | 2/1982 | Pitman | 137/119 |
| 4,316,480 | 2/1982 | Kah, Jr. | 137/119 |
| 4,322,297 | 3/1982 | Bajka | 210/742 |
| 4,327,772 | 5/1982 | Kawabata | 137/625.48 |

*Primary Examiner*—Martin P. Schwadron
*Assistant Examiner*—James R. Shay
*Attorney, Agent, or Firm*—Fulwider, Patton, Rieber, Lee & Utecht

[57] ABSTRACT

A flow control valve assembly is provided for timing and regulating fluid flow from a valve inlet to primary and secondary fluid flow outlets. The valve assembly comprises a regulator valve which, upon initiation of fluid flow to the valve assembly, is spring-biased to open the primary and secondary outlets and to modulate the primary outlet flow in a manner maintaining the secondary outlet flow at a predetermined minimum fluid pressure. Upon elapse of a predetermined time interval, a timer assembly responsive to the secondary outlet flow triggers an alteration in the spring bias acting on the regulator valve to permit fluid pressure at the valve inlet to shift the regulator valve to a position closing the secondary outlet and fully opening the primary outlet for the remaining time of a fluid flow cycle. When fluid flow through the valve assembly is halted, a return spring resets the regulator valve to its initial state. In a preferred operating environment, the valve inlet is coupled to the discharge side of a swimming pool circulation pump which draws pool water through a filter unit. The primary outlet of the valve assembly is coupled to a return conduit for recycling filtered water to the swimming pool, and the secondary outlet is coupled to a water-powered in-the-pool cleaning device. During a normal filtration cycle, the valve assembly initially supplies water to the cleaning device at a predetermined minimum pressure for a selected time interval and then automatically switches state to halt operation of the cleaning device and to recirculate filtered water to the pool through the return conduit.

50 Claims, 8 Drawing Figures

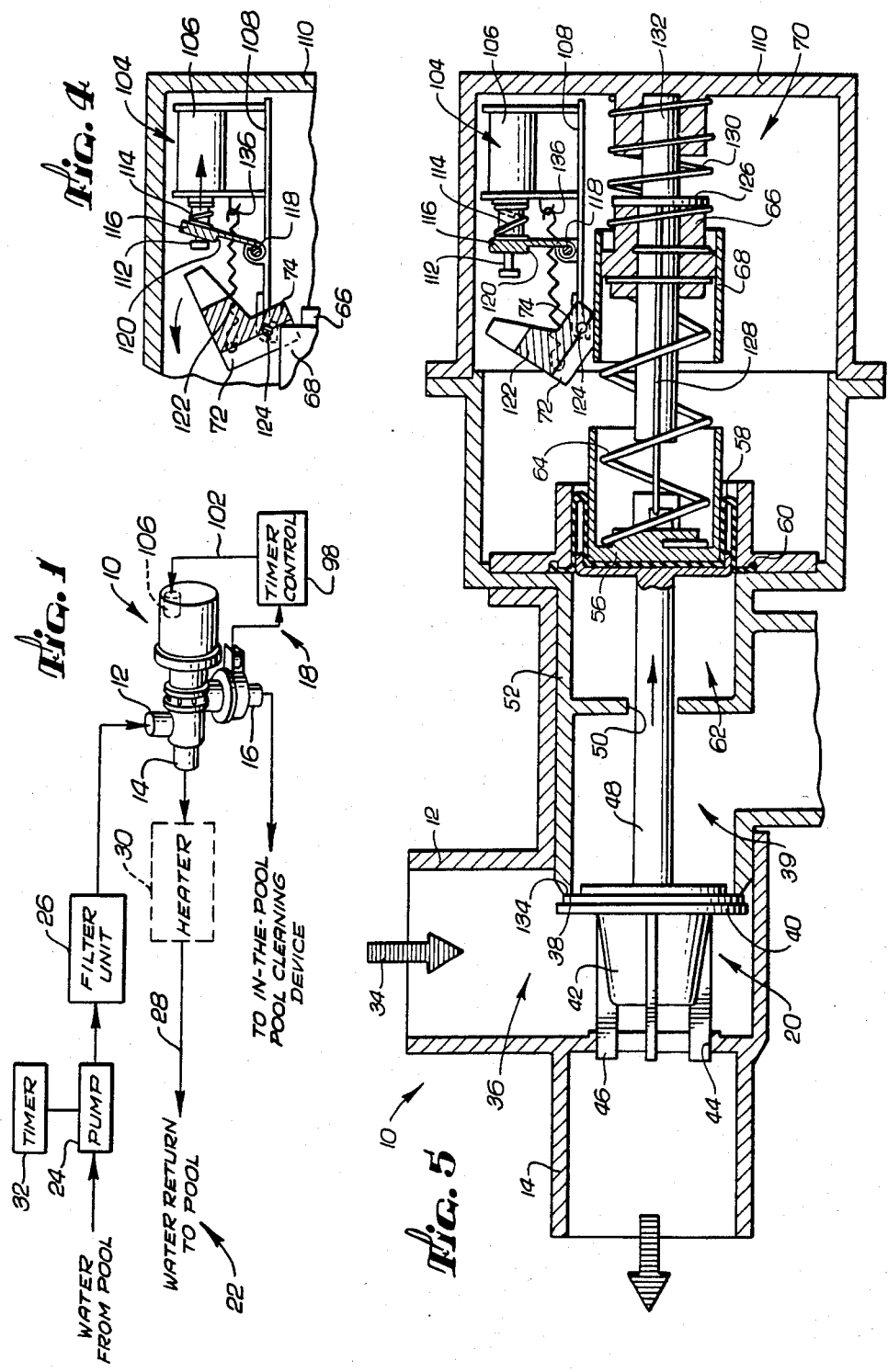

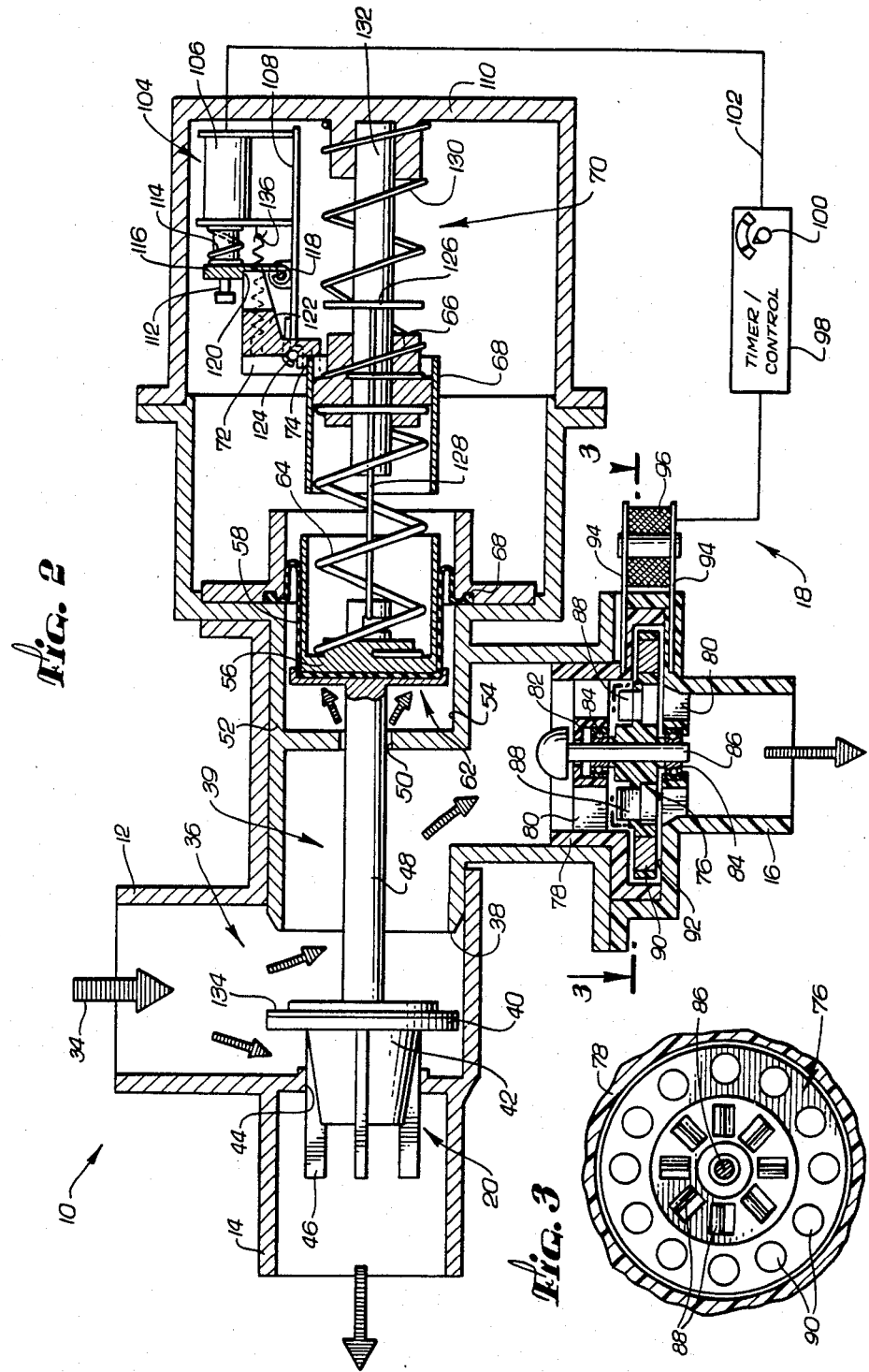

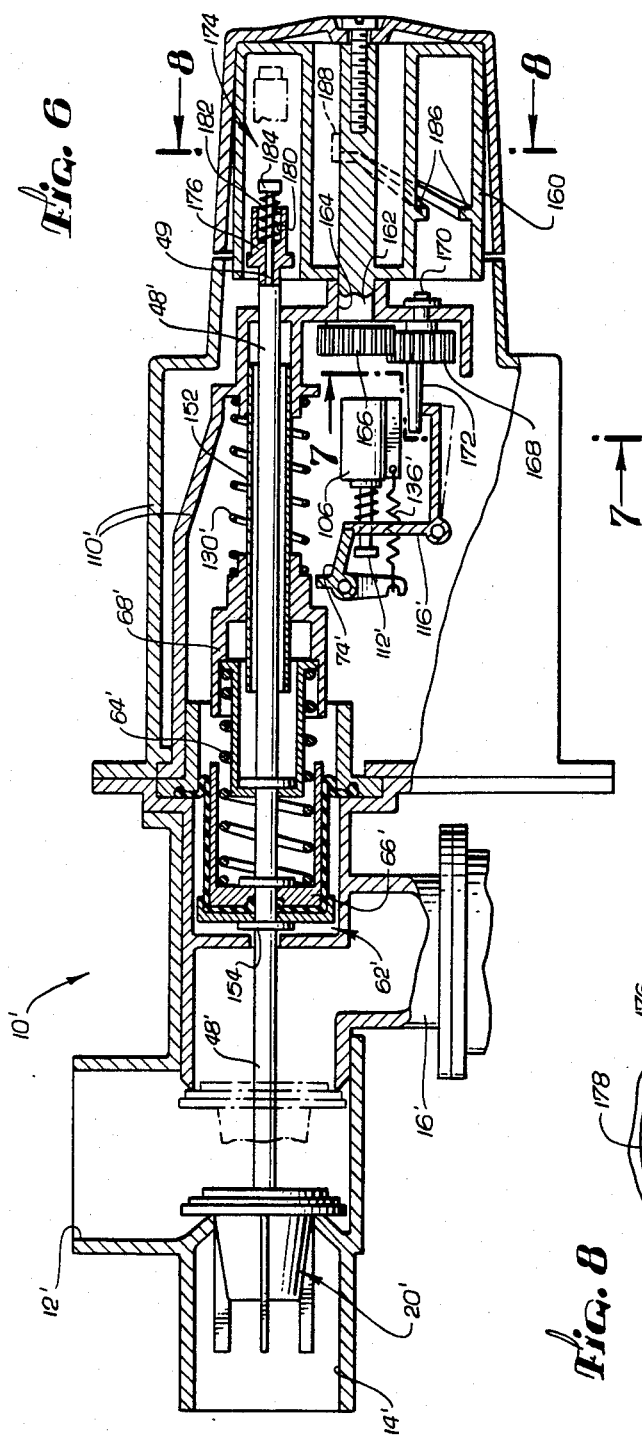
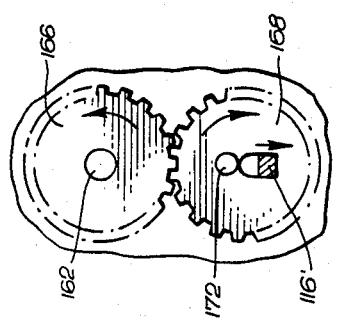

TIMED FLOW CONTROL VALVE ASSEMBLY

BACKGROUND OF THE INVENTION

This invention relates generally to timed control valves and the like for controlling and regulating fluid flow to multiple fluid outlets. More particularly, this invention relates to a timed control valve assembly for maintaining a regulated fluid flow through a fluid outlet for a selected time interval and then for automatically switching state to direct the fluid flow to a different fluid outlet. The invention has particular utility in a swimming pool environment for supplying filtered pool water at a predetermined minimum pressure to an automatic in-the-pool cleaning device and then, after a selected time interval, switching state to halt cleaning device operation and resume normal recirculation of filtered water to the pool.

In a conventional swimming pool water filtration system, a circulation pump and a filter unit are installed at a convenient position outside the pool. In operation, the circulation pump cycles pool water through the filter unit for removal of dirt and other suspended particulate matter, followed by recirculation of the filtered water to the swimming pool through a return conduit. To maintain proper standards of cleanliness and water clarity, the circulation pump is normally operated on a daily schedule, and moreover, must have a relatively high volumetric flow capacity sufficient to circulate and filter the entire volume of water contained in the pool in a few hours of pump operation. For example, in the state of California, swimming pool filtration standards require the circulation pump to be capable of circulating the entire volume of pool water in not more than twelve hours for residential installations and not more than eight hours for commercial installations. In actual practice, a typical daily operating time for a pool filtration system is about six to eight hours, with an electric time being frequently provided for automatically starting and stopping pump operation to prevent inadvertent excessive energy consumption.

While a swimming pool filtration system of the type described above is essential for maintaining water cleanliness and clarity, such filtration systems by themselves are incapable of maintaining a swimming pool in a satisfactory state of cleanliness. For example, conventional water filtration systems are not designed for removing sizable debris, such as leaves, or for removing particulate matter which has settled onto the pool bottom or side walls. Accordingly, periodic cleaning of the pool bottom and side walls is required for removal of such sizable debris and sediment.

A variety of in-the-pool cleaning devices are well known for use in cleaning the bottom and side wall surfaces of a swimming pool. One such device comprises, for example, a so-called vaccum head which is connected to the suction side of the pool filtration system and then moved manually over submerged pool surfaces to draw debris and sediment into the main filter unit.

In recent years, a variety of automated in-the-pool cleaning devices have become popular for removing or assisting in the removal of debris and sediment without requiring manual operation or attention. See, by way of example, the in-the-pool cleaning devices shown and described in U.S. Pat. Nos. 3,032,044 and 3,822,754. Such automated in-the-pool cleaning devices in general are driven by a supply of pressurized water.

One readily available source of pressurized water for powering an in-the-pool cleaning device comprises the pool water filtration system. However, connection of the filtration system return conduit to the in-the-pool cleaning device results in a substantial and undesirable backpressuring of the pool circulation pump to increase pump load and decrease the pump flow rate thereby increasing pump energy consumption and prolonging the time period the pump must be operated to maintain water cleanliness. In an effort to overcome these disadvantages, the use of booster pumps has been proposed for boosting the pressure of a portion of the filtered water discharged by the circulation pump without significantly increasing circulation pump backpressure, with the pressure-boosted water being supplied to the in-the-pool cleaning device at a pressure sufficient for cleaning device operation. However, the provision of a second pump in the filtration system also undesirably increases energy consumption and further substantially increases the cost of pool cleaning equipment.

Additional problems which have been encountered with automated in-the-pool cleaning devices relate to a lack of satisfactory timing mechanisms for limiting their time interval of operation to correspondingly limit overall cleaner wear and power consumption. Manual on-off operation of the cleaning device, of course, undesirably requires operator attention and is subject to operator forgetfulness. Automatic timing devices heretofore available have not been integrated satisfactorily with the timed operation of the main circulation pump, thereby permitting unintended failure of the cleaning device to operate according to schedule.

There exists, therefore, a significant need for an automated valve apparatus having integrated timing means for activating and operating an in-the-pool cleaner device in conjunction with a conventional pool filtration system and in an energy-efficient manner, and for automatically halting cleaner device operation at the conclusion of a predetermined time interval. The present invention fulfills this need and provides further related advantages.

SUMMARY OF THE INVENTION

In accordance with the invention, a timed flow control valve assembly is provided for controlling the distribution and pressure level of fluid flow from a valve inlet to multiple fluid outlets. The valve assembly comprises a regulator valve operable in at least two different states for controlling and regulating fluid flow to different fluid outlets, and a timer assembly for shifting the regulator valve from one operative state to another at the conclusion of a predetermined time interval.

In a preferred form of the invention, the regulator valve is movably positioned between primary and secondary fluid outlets and is biased by a regulator spring, upon initiation of fluid flow to the valve inlet, to modulate fluid flow to the primary outlet in a manner maintaining a fluid flow through the secondary outlet at a regulated, predetermined pressure level. The timer assembly includes a flow detector means responsive to fluid flow through the secondary outlet for providing an input signal to an electronic timer/control which, at the conclusion of the predetermined time interval, triggers a latch assembly to remove the regulator spring bias from the regulator valve. When this occurs, fluid pressure at the valve inlet is sufficient to displace the regulator valve to a position closing the secondary outlet to fluid flow and permitting substantially unobstructed fluid flow through the primary outlet for the duration of a fluid flow cycle. When the fluid flow cycle is concluded, a relatively weak return spring resets the latch assembly to apply the regulator spring bias to the regulator valve thereby returning the regulator valve to its initial state preparatory to a subsequent fluid flow cycle.

In a preferred working environment, the timed flow control valve assembly has its valve inlet coupled to the discharge side of a circulation pump in a conventional swimming pool filtration system. The primary outlet is connected to a return conduit through which filtered water is returned to the swimming pool, whereas the secondary outlet is coupled to an automatic, water-driven, in-the-pool cleaning device.

In operation, upon initiation of a pool water filtration cycle, the regulator valve diverts a portion of the filtered pool water to the secondary outlet and restricts flow through the primary outlet in a controlled manner to maintain the pressure level of the diverted flow at a level sufficient for satisfactory operation of the in-the-pool cleaning device. The flow detector means comprises a water-driven turbine installed along the secondary outlet and carrying a peripheral array of magnets arranged for flow-responsive movement in close proximity with stationary pole pieces coupled electrically to an armature coil. Water flow through the secondary outlet thus results in the generation of electrical current which is coupled to the electronic timer/control.

The electronic timer/control activates a triggering device, such as a solenoid assembly, at the conclusion of a selected time interval for cleaning device operation to substitute the biasing influence of the regulator spring on the regulator valve with the biasing force of the comparatively weaker return spring. Fluid pressure at the valve inlet overcomes the biasing force of the return spring to displace the regulator valve into seated engagement with a valve seat closing the secondary outlet and fully opening the primary outlet for the duration of the filtration cycle. When water flow through the valve assembly ceases, the return spring resets the latch assembly to return the regulator valve to its initial state for timed and pressure-regulated operation of the in-the-pool cleaning device at the beginning of a subsequent filtration cycle.

In accordance with one feature of the invention, the electronic timer/control is designed to send a trigger signal to the solenoid assembly at regular, frequent intervals to move a solenoid plunger ballistically into impact engagement with a trigger latch repeatedly until the trigger latch releases a spring-loaded latch lever which initiates operation of the latch assembly to alter the spring bias acting on the regulator valve. This ballistic operation of the solenoid plunger permits use of a relatively small solenoid assembly and further insures fail-safe operation of the valve assembly by repetitious impact with the trigger latch until the latch lever is released which results in no further flow through the secondary outlet and a cessation in trigger pulses to the solenoid assembly.

In accordance with a further feature of the invention, the valve assembly includes a manual override control for selectively triggering movement of the regulator valve to the position closing the secondary outlet, or alternatively, for positively locking the regulator valve in the position closing the secondary outlet. This override control comprises a control knob mounted rotatably on a valve assembly housing for moving a release cam bar into engagement with the latch lever to move the latch lever in a direction initiating the operation of the latch assembly to alter the spring bias on the regulator valve. Further, control knob rotation moves a cam track into sliding engagement with a cam follower movable with the regular valve to draw the regulator valve to the position closing the secondary outlet.

Other features and advantages of the present invention will become more apparent from the following detailed description, taken in conjuction with the accompanying drawings, which illustrate, by way of example, the principles of the invention.

BRIEF DESCRIPTION OF THE DRAWINGS

The accompanying drawings illustrate the invention. In such drawings:

FIG. 1 is a somewhat schematic perspective view of a timed flow control valve assembly embodying the novel features of the present invention and illustrated in diagrammatic relation as a portion of a swimming pool filtration and cleaning system;

FIG. 2 is a longitudinal vertical section of the timed flow control valve assembly and illustrates the valve assembly in a first or initial state of operation;

FIG. 3 is a horizontal section taken generally on the line 3—3 of FIG. 2;

FIG. 4 is an enlarged fragmented longitudinal vertical section of a portion of the valve assembly and illustrating movement thereof from one operating state to another;

FIG. 5 is a fragmented longitudinal vertical section of the valve assembly generally similar to FIG. 2 and illustrating the valve assembly in a second state of operation;

FIG. 6 is a longitudinal vertical section similar to FIG. 5 illustrating an alternative preferred form of the invention including a manual override control for overriding normal operation of the valve assembly;

FIG. 7 is a fragmented vertical section taken generally on the line 7—7 of FIG. 6; and FIG. 8 is a fragmented vertical section taken generally on the line 8—8 of FIG. 6.

DETAILED DESCRIPTION OF THE PREFERRED EMBODIMENT

As shown in the exemplary drawings, a timed flow control valve assembly referred to generally by the reference numeral 10 is provided for controlling and regulating fluid flow from a valve inlet 12 to multiple fluid outlets 14 and 16. The valve assembly 10 includes in its preferred form an integrated timer assembly 18 for automatically switching the operative state of a regulator valve 20 (not shown in FIG. 1) which controls fluid flow to the fluid outlets 14 and 16.

The timed flow control valve assembly 10 is shown in FIG. 1 as a portion of a swimming pool filtration and cleaning system 22. This filtration and cleaning system 22 is illustrated diagrammatically to include a circulation pump 24 operated normally for several hours on a daily basis to draw water from a swimming pool and to circulate the water through a filter unit 26 of conventional design for filtering dirt and other particulate matter from the pool water. The thus-filtered pool water is circulated by the pump 24 to the valve inlet 12 of the control valve assembly 10 for appropriate, regulated distribution to the fluid outlet 14 which comprises a primary outlet coupled to a return conduit 28 for return flow to the pool, and/or to the fluid outlet 16 which comprises a secondary fluid outlet coupled to an in-the-pool cleaning device, such as a water-powered cleaning device of the type shown and described, for example, in U.S. Pat. Nos. 3,032,044 and 3,822,754. In some filtration and cleaning systems 22, a heater 30 can be installed along the length of the return conduit 28 to elevate water temperature, with appropriate bypass conduits (not shown) being provided for circulation of water in bypass relation to the heater when temperature elevation is not required.

The flow control valve assembly 10 of this invention comprises a relatively simple and inexpensive device for insuring supply of pressurized water to the in-the-pool cleaning device for proper operation of the cleaning device during a selected, limited portion of a longer filtration cycle, as governed by an automatic timer 32 which controls activation and operation of the circulation pump 24. More particularly, upon initiation of a filtration cycle, which can typically last approximately six to eight hours, the valve assembly 10 permits water flow through both the primary and secondary fluid outlets 14 and 16 while modulating primary outlet flow to maintain secondary outlet pressure at a predetermined threshold chosen for satisfactory operation of the in-the-pool cleaning device. At the conclusion of a predetermined time interval chosen for thorough cleaning device operation, and as detected by the integrated timer assembly 18, the regulator valve switches state to close the secondary outlet to fluid flow and to permit substantially unobstructed fluid flow through the primary outlet 14 for normal return to the pool.

The timed flow control valve assembly 10 therefore advantageously insures satisfactory operation of the in-the-pool cleaning device without requiring additional booster pumps and further without prolonged or excessive energy-inefficient backpressure on the circulation pump 24. As soon as the pool cleaning device has operated for a satisfactory time period, the valve assembly 10 automatically switches to the alternate state for permitting normal operation of the filtration system in an energy-efficient manner with very little backpressure on the pump 24. Accordingly, the flow control valve assembly 10 operates automatically in the absence of any manual operator attention and in response only to operation of the circulation pump 24 such that pool cleaning device operation is synchronized in a fail-safe manner with operation of the circulation pump 24.

The timed flow control valve assembly 10 is shown in more detail in an initial operative state in FIGS. 2 and 3. As illustrated, the valve inlet 12 comprises an appropriately size cylindrical inlet port through which fluid, such as pool water, can flow in the direction of arrow 34 into an internal control chamber 36. The regulator valve 20 is movably positioned within this control chamber 36 for movement between the primary outlet 14 and an annular valve seat 38 at the entrance end of an auxiliary flow path 39 defining the secondary outlet 16. The regulator valve comprises, in the preferred form, a circular valve disk 40 positioned and sized for overlying the valve seat 38 and joined to a truncated conical valve head 42 to project axially with decreasing diametric size toward and for partial reception into a port 44 opening to the primary outlet 14. A circumferential array of axially extending guide legs 46 surround the valve head 42 and project from the disk 40 through the outlet port 44 irrespective of the operative state of the regulator valve 20 for guiding regulator valve movement, as will be described in more detail.

The regulator valve 20 is carried at one end of an actuator rod 48 which extends from the valve disk 40 in a direction away from the valve head 42 and through the flow path 39 for clearance passage through an opening 50 at one end of a control cylinder 52. This control cylinder defines a cylindrical bore 54 having a control piston 56 received therein for sealed axial sliding movement with respect thereto by means of a rolling diaphragm 58 having an annular outer bead 60 trapped between matingly interfitting portions of the control cylinder 52. As shown best in FIG. 2, the diaphragm 58 cooperates with the cylinder 52 to define a pressure control chamber 62 with damped exposure to fluid pressure within the secondary outlet 16 through the opening 50.

The control piston 56 is engaged at its side opposite the control chamber 62 by a regulator spring 64 having its opposite or rear end bearing against a support spool 66 secured within a latch cylinder 68 of a latch assembly 70. This spool 66 and latch cylinder 68 are in turn normally retained in an axial position advanced toward the control piston 56 for partial compression of the regulator spring 64 by a latch lever 72 having a lower abutment 74 in engagement with the rear axial end of the latch cylinder.

When the control valve assembly 10 is in the initial operative state as described above, the fluid is flowing through the valve inlet 12 into the chamber 36, the partially compressed regulator spring 64 applies a regulating force to the control piston 56 and further through the actuator rod 48 to the regulator valve 20. This regulator force displaces the valve disk 40 from the valve seat 38 thereby opening the secondary outlet 16 to fluid flow and further positioning the tapered truncated conical head 42 of the regulator valve partially within the port 44 leading to the primary outlet 14. Fluid flow entering the valve inlet 12, therefore, is permitted to enter and flow through the secondary outlet 16 to the in-the-pool cleaning device. However, the pressure of this fluid flow at the secondary outlet acts against the control piston 56 in counteraction to the regulatory spring force to urge the regulator valve 20 back toward the valve seat 38. The spring and fluid forces thus acting upon the control piston vary the position of the valve head 42 within the outlet port 44 to modulate fluid flow to the primary outlet 14 in a manner maintaining the pressure level of flow through the secondary outlet at a substantially constant level. Importantly, the spring characteristics of the regulator spring 64 are chosen such that this constant pressure level is at or slightly above a minimum threshold required for satisfactory operation of the in-the-pool cleaning device, while substantially minimizing backpressure on the circulation pump 34, thereby insuring cleaning device operation with minimum pump power consumption.

Fluid flow through the secondary outlet 16 is monitored and timed by the timer assembly 18 which thus detects and controls the time interval of operation of the in-the-pool cleaning device. More particularly, the timer assembly 18 comprises a disk-shaped water turbine 76 installed along the length of the secondary outlet for rotation in response to and as a function of secondary outlet water flow. This water turbine 76, as shown in FIGS. 2 and 3, comprises a generally cylindrical cartridge 78 having upper and lower webs 80 with central hubs 82 within which are supported bearings 84 for rotatably supporting a turbine spindle 86. The spindle 86 carries the water turbine 76 in a position between the upper and lower webs 80 and further in position with a circular array of turbine vanes 88 positioned for flow interaction with fluid flowing through the secondary outlet 16. In addition, the turbine wheel 76 supports a peripheral circular pattern of magnets 90 arranged preferably with alternating polarity for rotational movement within a small annular chamber 92 surrounding the water flow path.

The magnet chamber 92 is positioned, at one side of the water turbine 76, between a pair of iron pole pieces 94 which are appropriately connected to an armature coil 96. By constructing the surrounding support structures from a nonmagnetizable material, such as plastic, fluid-driven rotation of the turbine wheel 76 moves the magnets 90 past the pole pieces 94 to generate an electrical current within the armature coil 96.

The thus-generated electrical current continues for the duration of water flow through the secondary outlet and thus comprises a time-indicative signal which is coupled as shown schematically in FIG. 2 to an electronic timer/control 98 which includes appropriate timing devices for detecting the duration of electrical current generation from the armature coil 96. A manually settable control knob 100 is conveniently provided on the timer/control to permit manual adjustment and selection of the predetermined time interval, with time interval selections of about ninety minutes and three hours being typical in the preferred working environment described herein. However, the construction and operation of the timer/control may take any one of a number of well-known circuit forms, whereby this timer/control is not shown or described in detail herein.

At the conclusion of the predetermined set time interval, the timer/control 98 sends a trigger signal over a control line 102 to a trigger assembly 104 which activates the latch assembly 70 to cause a switching in the operative state of the regulator valve 20. More particularly, in the illustrative preferred form of the invention, the trigger assembly 104 comprises a solenoid assembly 106 mounted on a platform 108 within a closed housing 110. The solenoid assembly 106 is responsive to the trigger signal to retract a headed solenoid plunger 112 against a spring 114 into ballistic impact with a trigger latch 116. The trigger latch 116 is supported on the platform 108 for swinging movement about a pivot 118 to displace a trigger shoulder 120 from an upper crank arm 122 of the latch lever 72. Such displacement of the trigger latch shoulder 120 permits the latch cylinder 68 bearing against the lower latch lever abutment 74 to pivot the latch lever 72 about a pivot 124 toward an out-of-the-way position, as viewed in FIG. 4, thereby permitting rearward displacement of the latch spool 66 and cylinder 68.

The above-described rearward movement of the latch spool cylinder is accompanied by an extension of the regulator spring 64, within limits provided by a stop 126 and limit link 128 connected between the stop 126 and the control piston 56. In addition, such movement partially compresses a comparatively weaker return spring 130 which reacts compressively between the rear side of the latch spool 66 and the housing 110, with a guide rod 132 being provided therebetween for slidably guiding latch spool movement. This effectively removes the influence of the regulator spring 64 from the regulator valve 20 and substitutes instead the force bias of the weaker return spring 130 which is insufficient to overcome the force on the piston due to the pressure of fluid at the valve inlet 12. Accordingly, the inlet fluid pressure displaces the regulator valve 20 to a position shown in FIG. 5 with the valve disk 40 overlying and seated against the valve seat 38, with an annular gasket 134 being provided for insuring sealed engagement with the valve seat. This effectively halts fluid flow through the secondary outlet 16 to correspondingly halt operation of the in-the-pool cleaning device and further retracts the valve head 42 from the outlet port 44 to permit substantially unobstructed flow of the entire pump outflow through the primary outlet 14 for return to the pool for the duration of the filtration cycle.

In accordance with a further feature of the invention, the timer/control 98 is conveniently designed with a relatively rapidly charged capacitor circuit which is discharged by appropriate electronic switch means at the conclusion of the selected timer interval for cleaning device operation. Such construction of the timer/control 98 permits a relatively rapid, repeated sending of the trigger signal to the solenoid assembly 106 in the event a single ballistic impact of the headed plunger with the trigger latch 116 is insufficient to release the latch lever 72. More particularly, in the event of such failure to release the latch lever 72, continued water flow through the secondary outlet 16 will quickly recharge the capacitor circuit in the timer/control 98 which will be promptly discharged by the electronic switch means thereby sending a subsequent trigger signal to the solenoid assembly 106. Accordingly, repeated ballistic impacts between the solenoid plunger 112 and the trigger latch 116 will incrementally but ultimately release the latch lever 72 thereby providing a fail-safe mechanism for switching operative states of the regulator valve 20.

Once the regulator valve 20 is switched to the operative state shown in FIG. 5, continuing fluid pressure at the inlet 12 will maintain the valve assembly in that operative state for the completion of the filtration cycle. However, when the circulation pump 24 (FIG. 1) is turned off at the conclusion of the filtration cycle, water pressure at the valve inelt 12 is removed to permit a return of the regulator valve 20 to its intital state, as shown in FIG. 2, under the biasing influence of the return spring 130. Importantly, this return movement returns the latch spool 66 and latch cylinder 68 to their original state positions thereby permitting a relatively lightweight spring 136 to pivot the latch lever 72 downwardly for movement of its lower abutment 74 into supporting engagement with the rear axial end of the cylinder 68. Downward pivoting movement of the latch lever causes the crank arm 122 to engage the trigger latch 116 and move beneath the shoulder 120 thereof to lock and reset the valve assembly 10 in its initial operative state.

When a subsequent filtration cycle is initiated, the valve assembly 10 is therefore in the initial operative state for timed and regulated flow through the secondary outlet to the in-the-pool cleaning device until the timer/control 98 sends an appropriate trigger signal to the trigger assembly 104 which in turn activates the latch assembly 70 to alter the state position of the regulator valve 20.

The timed flow control valve assembly 10 of the present invention therefore provides a relatively simple yet highly versatile device for regulating and controlling fluid flow and thus the volume of fluid delivered to multiple fluid outlets. In the context of a swimming pool filtration and cleaning system, the valve assembly advantageously insures efficient pump operation while further insuring satisfactory operation of an in-the-pool cleaning device for a prescribed time period. At the conclusion of the prescribed time period, the valve assembly 10 automatically switches state to halt cleaning device operation and to return circulated filtered water in a normal manner to the swimming pool. However, upon initiation of a subsequent filtration cycle, the valve assembly automatically resets for regulated, timed operation of the cleaning device.

An alternative preferred form of the invention is illustrated in FIGS. 6–8 wherein components identical functionally with those shown and described in the embodiment of FIGS. 1–5 are referred to by common primed reference numerals. As illustrated, this alternative embodiment includes a manual override control 150 for selectively shifting a regulator valve 20' to a second operative state or for positively locking the regulator valve 20' in the second operative state.

More particularly, with reference to FIG. 6, the alternative flow control valve assembly 10' includes the regulator valve 20' movable between a primary outlet 14' and a secondary outlet 16' to controllably regulate the flow of fluid from a valve inlet 12'. The regulator valve 20' is supported at one end of an actuator rod 48' which, as shown in FIG. 6, extends through a pressure control chamber 62', a control piston 56', a support spool 66', a latch cylinder 68', and further through a metal guide sleeve 152 into operative association with the manual override control 150. A resilient diaphragm 58' is coupled to the piston 56', with retaining rings 154 being provided to secure the piston and a central region of the diaphragm at a selected axial position on the rod 48'. A regulator spring 64' reacts between the piston 56' and the support spool 66' to apply a biasing force upon the piston, as will be described. An additional retaining ring 156 limits axial motion of the support spool 66' away from the piston 56' to maintain the regulator spring 64' in a partially compressed state.

The regulator valve 20' and the control piston 56' are supported in an initial position ready for fluid flow to the valve inlet 12' by a latch lever 74' mounted pivotally within a housing 110' and supported by one leg of an L-shaped trigger latch 116' in a position blocking rearward motion of the latch cylinder 68' on the sleeve 152. Accordingly, upon initiation of such fluid flow, the regulator valve 20' is biased by the regulator spring 64' in the same manner described with respect to FIGS. 1–5 to regulate fluid flow through the primary outlet 14' in a manner maintaining the pressure of the flow through the secondary outlet 16' at a predetermined minimum level chosen, for example, for proper operation of an in-the-pool cleaning device for a swimming pool. At the conclusion of a predetermined time interval, however, a timer assembly (as shown in FIGS. 6–8) signals a solenoid assembly 106' to retract a headed, spring-loaded plunger 112' into ballistic impact with the trigger latch 116'. This impact displaces the trigger latch 116' from beneath the latch lever 74', as viewed in FIG. 6, thereby permitting rearward movement of the latch cylinder 68' and support spool 66' and correspondingly substituting the force-bias of the regulator spring 64' with the lower force-bias of a return spring 130' reacting between the housing 110' and the rear end of the latch cylinder 68'. Importantly, the return spring is unable to prevent fluid pressure-responsive movement of the regulator valve 20' to the dotted line position shown in FIG. 6 wherein the secondary outlet 16' is closed and substantially unobstructed flow is permitted through the primary outlet 14'. Of course, when fluid flow through the inlet 12' ceases, the return spring 130' returns the regulator valve 20' to the initial position thereby permitting resetting movement of the latch lever 74' into engagement with the latch cylinder 68' in response to a small biasing spring 136'.

The valve assembly 10' described thus far, corresponds functionally with the embodiment of FIGS. 1–5 to switch operative states of the regulator valve 20' at the conclusion of a predetermined time interval. However, in some instances, it may be desirable to interrupt normal valve assembly operation in the initial state permitting fluid flow at regulated pressure through the secondary outlet 16', thereby halting operation of an in-the-pool cleaning device or the like. Such manual interruption is achieved quickly and easily by operation of the manual override control 150.

The manual override control comprises an easily grasped control knob 160 mounted on the housing 110' at a position generally opposite the regulator valve and including a central shaft 162 received rotatably through a bore 164 in the housing 110'. A toothed gear 166 is carried at the inboard end of the central shaft 162 in meshed relation with a second toothed gear 168 (FIG. 7) supported on the housing by a rotatable spindle 170. A release cam bar 172 is formed on this second gear 168 to project into the housing 110' along an axis disposed off-center relative to the rotational axis of the spindle 170 whereby the release cam bar 172 is displaced up and down as viewed in FIG. 6 upon rotation of the associated gear 168.

The release cam bar 172 is positioned to contact one leg of the L-shaped trigger latch 116' at a point generally opposite the latch lever 74'. When the control knob 160 is rotated about the axis of the central shaft 162, the meshing gears 166 and 168 are correspondingly rotated to displace the release cam bar 172 downwardly, as viewed in FIG. 6, against the trigger latch 116'. The release cam bar 172 rotates the trigger latch through a small angle to the illustrated dotted line position thereby releasing the latch lever 74' and permitting movement of the regulator valve 20' to the second operative state closing the secondary outlet 16' and fully opening the primary outlet 14'.

In some instances, it may be desirable to positively lock the regulator valve 20' in the secondary operative state closing the secondary outlet 16' to fluid flow. For example, in a swimming pool environment, positive closure of the secondary outlet 16' is desirable during cleaning of the filter unit of a filtration and cleaning system thereby preventing passage of filter media through the secondary outlet where it might clog timing components or an in-the-pool cleaning device. The manual override control 150 illustrated in FIG. 6 includes means to obtain this postive closure of the secondary outlet 16'.

More particularly, the actuator rod 48' carrying the regulator valve 20' extends through the housing 110' and includes a reduced diameter portion 49 projecting a short distance into an annular cavity 174 formed in the control knob 160. A cam follower 176 is secured to this rod portion 49 and is shaped to provide a radially enlarged cam flange 178 and further to provide a recessed well 180 within which a spring 182 reacts against a cap 184 at the end of the rod portion 49. In addition, cam tracks 186 are formed on the radially opposed walls of the annular cavity 174 to extend with a spiral configuration through a rotational angle of about 180 degrees, with a raised stop 188 formed at the rearmost end of the cam tracks.

In the normal operating position of the valve assembly, the cam follower 176 on the actuator rod 48' is positioned within a portion of the annular cavity 174 spaced circumferentially from the cam tracks 186, as viewed in FIG. 8. Accordingly, the cam follower 176 and the actuator rod 48' are free to move longitudinally within the cavity 174 for time-controlled movement of the regulator valve 20' between the two operative states.

When the control knob 160 is rotated through a small angular increment of about 90 degrees in the direction of arrow 190 in FIG. 8, the previously described toothed gears 166 and 168 displace the release cam bar 172 to manually release the trigger latch 116' from the latch lever 74' thereby switching the valve assembly in the second operative state. However, in the absence of fluid flow through the valve inlet 12', such state switching will be inadequate to move the regulator valve 20' to a position closing the secondary outlet 16'.

Further rotational movement of the control knob 160 brings the cam tracks 186 into engagement with the cam flange 178 on the cam follower 176 and manually draws the actuator rod 48' in a longitudinal direction into the control knob 160. Importantly, the longitudinal dimension of the cam tracks 186 is sufficient to draw the follower 176 to the dotted line position shown in FIG. 6 with the cap 184 engaging the raised stop 188, thereby partially compressing the spring 182 and correspondingly drawing the regulator valve 20' to the illustrated dotted line position positively closing the secondary outlet 16'. The stop 188 prevents movement of the follower 176 off the tracks 186 in the rearward direction, and the spring 182 applies an axial force to the regulator valve greater than that applied by the return spring 130' to hold the valve 20' in the positively locked position until the control knob 160 is rotated in the reverse direction. Conveniently, appropriate markings or indicia (not shown) can be provided on the exterior of the housing 110' and the control knob 160 to indicate the particular position of control knob adjustment.

A wide variety of modifications and improvements to the valve assembly described herein are believed to be apparent to one of ordinary skill in the art. For example, in the event of temporary power interruption to the circulation pump 24 during a filtration cycle, the electronic timer/control 98 can be adapted as desired for return to its initial state upon power supply resumption or for continuing the filtration cycle as if no interruption had occurred. Accordingly, no limitation on the invention is contemplated by way of the description herein, except as set forth in the appended claims.

What is claimed is:

1. A flow control valve assembly, comprising:
   a valve inlet for receiving a flow of fluid under pressure;
   a primary fluid outlet;
   a secondary fluid outlet;
   a regulator valve;
   control means coupled to said regulator valve, said control means including a control piston movably positioned within a control cylinder in response to the pressure of fluid at said secondary outlet, a regulator spring for biasing said control piston to position said regulator valve in a first operative state permitting fluid flow through both said primary and secondary outlets and modulating flow through said primary outlet to maintain flow through said secondary outlet at a predetermined and substantially constant level, and a return spring for biasing said control piston to position said regulator valve in a second operative state closing said secondary outlet to fluid flow and permitting substantially unobstructed fluid flow through said primary outlet;
   a latch assembly movable between a latched position supporting said regulator spring in force-biased engagement with said control piston and an unlatched position removing the force-bias of said regulator spring from said control piston and applying in lieu thereof the force-bias of said return spring, said regulator spring normally urging said latch assembly toward said unlatched position;
   a timer assembly including means for detecting and timing fluid flow through said secondary outlet and for generating a trigger signal at the conclusion of fluid flow through said secondary outlet for a predetermined time interval; and
   a trigger assembly normally retaining said latch assembly in said latched position and responsive to said trigger signal for releasing said latch assembly for movement to said unlatched position.

2. The flow control valve assembly of claim 1 further including a housing, and wherein said regulator spring comprises a compression spring reacting between said control piston and one side of said latch assembly, and wherein said return spring comprises a comparatively weaker compression spring reacting between the opposite side of said latch assembly and said housing, said latch assembly including means for releasably supporting said regulator spring in a compressed state when said latch assembly is in the latched position.

3. The flow control valve assembly of claim 2 wherein said latch assembly comprises a latch spool disposed between said regulator and return springs, and wherein said releasable support means of said latch assembly comprises a latch lever having an abutment for releasably supporting said spool in the latched position, said latch lever being released by said trigger assembly in response to said trigger signal.

4. The flow control valve assembly of claim 3 wherein said latch lever is mounted for pivoting movement relative to said housing, and further including spring means for urging said latch lever toward a normal position with said abutment disposed for supporting said spool.

5. The flow control valve assembly of claim 3 wherein said trigger assembly comprises a trigger latch for normally retaining said latch lever in a position for supporting said latch spool in a latched position, and a solenoid assembly responsive to said trigger signal for moving said trigger latch to release said latch lever, said regulator spring thereupon moving said latch spool to the unlatched position.

6. The flow control valve assembly of claim 5 wherein said solenoid assembly includes a solenoid plunger for ballistic impact with said trigger latch in response to said trigger signal.

7. The flow control valve assembly of claim 6 wherein said timer assembly includes means for repetitively generating said trigger signal at the conclusion of said predetermined time interval for repeated impact of said plunger with said trigger latch until release of said latch lever.

8. The flow control valve assembly of claim 1 wherein the pressure of fluid flowing through said valve inlet acts upon said control piston in a direction urging said regulator valve toward said second operative state and said return spring applies a force-bias to said control piston in an opposite direction urging said regulator valve toward said first operative state with a force magnitude insufficient to return said regulator valve to said first operative state until cessation of fluid flow through said valve inlet.

9. The flow control valve assembly of claim 1 wherein said timer assembly comprises a turbine mounted along said secondary outlet for rotation in response to fluid flow through said secondary outlet, electrical current generation means for generating an electrical current in response to turbine rotation, and a timer responsive to generation of current by said current generation means for generating said trigger signal at the conclusion of said predetermined time interval.

10. The flow control valve assembly of claim 9 wherein said current generation means comprises a circular arrangement of magnets mounted on said turbine, a pair of pole pieces disposed respectively on opposite axial sides of said turbine in relatively close association with said magnets, and an armature coil coupled to said pole pieces, said coil being further coupled to said timer.

11. The flow control valve assembly of claim 9 wherein said timer includes means for selecting the duration of said predetermined time interval.

12. The flow control valve assembly of claim 1 wherein said regulator valve is disposed generally between said primary and secondary outlets and includes means for sealing said secondary outlet against fluid flow from said valve inlet when said regulator valve is in the second operative state.

13. The flow control valve assembly of claim 12 wherein said primary outlet includes an outlet port, and wherein said regulator valve includes a valve head of tapered shape disposed partially within said port for modulating flow therethrough when said regulator valve is in the first operative position, said regulator valve further including a plurality of guide legs projecting at least partially into said port to guide movement of said regulator valve between said first and second operative states.

14. The flow control valve assembly of claim 1 further including means for manually releasing said latch assembly from said trigger assembly.

15. The flow control valve assembly of claim 1 further including means for selectively locking said regulator valve in the second operative state.

16. The flow control valve assembly of claim 1 further including a manual override assembly having means for manually releasing said latch assembly from said trigger assembly and means for selectively locking said regulator valve in the second operative state.

17. The flow control valve assembly of claim 16 wherein said override assembly includes a rotatable control knob, said manual releasing means comprising first cam means operated by said control knob for moving said trigger assembly to a position releasing said latch assembly, and said locking means comprises second cam means operated by said control knob for moving said regulator valve to the second operative state.

18. A flow control valve assembly, comprising:
a valve inlet for receiving a flow of fluid under pressure;
a primary fluid outlet;
a secondary fluid outlet;
a regulator valve;
means for positioning said regulator valve in a first operative state permitting fluid flow through both said primary and secondary outlets and modulating fluid flow through said primary outlet to maintain fluid pressure at said secondary outlet at a predetermined and substantially constant pressure level for a predetermined time interval; and
means for positioning said regulator valve in a second operative state at the conclusion of said predetermined time interval closing said secondary outlet to fluid flow and permitting substantially unobstructed fluid flow through said primary outlet.

19. The flow control valve assembly of claim 18 further including means for returning said regulator valve to said first operative state upon cessation of fluid flow through said valve inlet.

20. The flow control valve assembly of claim 18 wherein said means for positioning said regulator valve in the second operative state includes timer means responsive to fluid flow through said secondary outlet.

21. A flow control valve assembly, comprising:
a valve inlet for receiving a flow of fluid under pressure;
a primary fluid outlet;
a secondary fluid outlet;
a regulator valve;
means for positioning said regulator valve in a first operative state permitting fluid flow through both said primary and secondary outlets and modulating fluid flow through said primary outlet to maintain fluid pressure at said secondary outlet at a predetermined and substantially constant pressure level for a predetermined time interval;
means for positioning said regulator valve in a second operative state at the conclusion of said predetermined time interval closing said secondary outlet to fluid flow and permitting substantially unobstructed fluid flow through said primary outlet; and
means for returning said regulator valve to said first operative state upon cessation of fluid flow through said valve inlet.

22. A flow control valve assembly, comprising:
a valve inlet for receiving a flow of fluid under pressure;
a primary fluid outlet;
a secondary fluid outlet;
a regulator valve disposed generally between said primary and secondary fluid outlets and movable therebetween to control and regulate fluid flow respectively therethrough; and
control means coupled to said regulator valve and including means for applying a first force-bias to said regulator valve for a predetermined time interval to control and regulate fluid flow to said primary and secondary fluid outlets in a first predetermined manner and then for applying a second force-bias to said regulator valve to control and regulate fluid flow to said primary and secondary fluid outlets in a second, predetermined manner.

23. The flow control valve assembly of claim 22 wherein said control means further includes means for reapplying the first force-bias to said regulator valve in response to cessation of fluid flow through said valve inlet.

24. A flow control valve assembly, comprising:
a valve inlet for receiving a flow of fluid under pressure;
a primary fluid outlet;
a second fluid outlet;
a regulator valve disposed generally between said primary and secondary fluid outlets and movable therebetween to control and regulate fluid flow respectively therethrough; and
control means coupled to said regulator valve and including means for applying a first force-bias to said regulator valve for a predetermined time interval to control and regulate fluid flow to said primary and secondary fluid outlets in a first predetermined manner and then for applying a second force-bias to said regulator valve to control and regulate fluid flow to said primary and secondary fluid outlets in a second, predetermined manner;
said control means comprising a control piston movably positioned within a control cylinder in response to the pressure of fluid at said secondary outlet, a regulator spring for applying the fluid force-bias to said control piston to position said regulator valve in a first operative state permitting fluid flow through both said primary and secondary outlets and modulating flow through said primary outlet to maintain flow through said secondary outlet at a predetermined and substantially constant level, and a return spring for applying the second force-bias to said control piston to position said regulator valve in a second operative state closing said secondary outlet to fluid flow and permitting substantially unobstructed fluid flow through said primary object.

25. The flow control valve assembly of claim 24 wherein said control means further includes a latch assembly movable between a latched position supporting said regulator spring in force-biased engagement with said control piston and an unlatched position removing the force-bias of said regulator spring from said control piston and applying in lieu thereof the force-bias of said return spring, said regulator spring normally urging said latch assembly toward said unlatched position.

26. The flow control valve assembly of claim 25 wherein said control means further includes a timer assembly including means for detecting and timing fluid flow through said secondary outlet and for generating a trigger signal at the conclusion of fluid flow through said secondary outlet for said predetermined time interval.

27. A flow control valve assembly, comprising:
at least three valve ports, at least one of said ports comprising a valve inlet and at least one other of said ports comprising a valve outlet;
a regulator valve disposed generally between two of said valve ports and movable therebetween to control and regulate fluid flow respectively therethrough; and
control means coupled to said regulator valve and including means for positioning said regulator valve in a first operative state for regulating and controlling fluid flow through said two ports in a first predetermined manner and then at the conclusion of a selected time interval for positioning said regulator valve in a second operative state for regulating and controlling fluid flow through said two ports in a second predetermined manner.

28. The flow control valve assembly of claim 27 wherein said control means further includes means for returning said regulator valve to said first operative state upon cessation of fluid flow through said valve inlet.

29. The flow control valve assembly of claim 27 wherein said control means includes timer means responsive to fluid flow through one of said paths.

30. The flow control valve assembly of claim 27 wherein said control means includes manual override means for selectively switching said regulator valve from said first operative state to said second operative state.

31. The flow control valve assembly of claim 27 wherein said control means includes manual override means for selectively locking said regulator valve in the second operative state.

32. A flow control valve assembly, comprising:
a valve inlet for receiving a flow of fluid under pressure;
a primary fluid outlet;
a secondary fluid outlet;
a regulator valve disposed generally between said primary fluid outlets and movable therebetween to control and regulate fluid flow respectively therethrough;
a control cylinder having a control piston movably received therein, said cylinder and piston cooperating to define a control chamber open to fluid flowing through said secondary outlet;
an actuator rod connected between said control piston and said regulator valve;
a housing;
a latch spool mounted within said housing for movement generally toward and away from said control piston;
a regulator spring reacting between said latch spool and said control piston for applying force-bias to said control piston in opposition to the fluid pressure within said control chamber;
a return spring reacting between said housing and said latch spool for urging said spool toward said control piston;
a latch lever for releasably supporting said latch spool in a latched position with said regulator spring in a compressed state such that said regulator spring applies a force-bias to said control piston substantially greater than the biasing force of said return spring for positioning said regulator valve in a first operating state permitting fluid flow through both said primary and secondary outlets and modulating flow through said primary outlet to maintain pressure at said secondary outlet at a substantially constant, predetermined level;
timer means for timing the duration of operation of said valve assembly with said regulator valve in said first operative state and for generating a trigger signal at the conclusion of a predetermined time interval; and
trigger means responsive to said trigger signal for moving said latch lever to a position releasing said spool thereby permitting movement of said spool away from said control piston in response to extension of said regulator spring and thereby removing the force-bias of said regulator spring from said control piston and compressing said return spring to apply the force-bias of said return spring to said control piston;

the force-bias of said return spring being insufficient to prevent movement of said regulator valve in response to fluid pressure at said valve inlet from said second operative state closing said secondary outlet and spaced from said primary outlet, said return spring force-bias being sufficient to return said latch means to the latched position and said regulator valve to the first operative state upon cessation of flow through said valve inlet.

33. The flow control valve assembly of claim 32 further including a manual override assembly having means for manually releasing said latch spool and means for manually locking said regulator valve in the second operative state.

34. The flow control valve assembly of claim 33 wherein said override assembly comprises a control knob rotatably mounted on said housing, first cam means responsive to control knob rotation for releasing said latch spool, and second cam means responsive to control knob rotation for drawing said regulator valve to the second operative state.

35. The flow control valve assembly of claim 34 wherein said first cam means comprises a gear member rotatable in response to control knob rotation and a cam bar on said gear member for moving said trigger means to a position moving said latch lever to release said latch spool.

36. The flow control valve assembly of claim 35 wherein said second cam means comprises a cam follower on said actuator rod, and a cam track on said control knob for movement into engagement with said follower upon rotation of said control knob beyond a position whereat said cam bar engages said trigger means, said cam track engaging and drawing said follower and said actuator rod to a position retaining said regulator valve in the second operative state.

37. The flow control valve assembly of claim 32 wherein said valve inlet is adapted for connection to a circulation pump of a swimming pool filtration system, and wherein said primary outlet is adapted for connection to a return conduit for returning pool water to the swimming pool and said second outlet is adapted for connection to an in-the-pool cleaning device.

38. The flow control valve assembly of claim 32 further including spring means for urging said latch lever normally toward the latched position.

39. The flow control valve assembly of claim 32 wherein said trigger means comprises a trigger latch for normally retaining said latch lever in a position for supporting said latch spool in a latched position, and a solenoid assembly responsive to said trigger signal for moving said trigger latch to release said latch spool to the unlatched position.

40. The flow control valve assembly of claim 39 wherein said solenoid assembly includes a solenoid plunger for ballistic impact with said trigger latch in response to said trigger signal.

41. The flow control valve assembly of claim 40 wherein said timer means includes means for repetitively generating said trigger signal at the conclusion of said predetermined time interval for repeated impact of said plunger with said trigger latch until release of said latch lever.

42. The flow control valve assembly of claim 32 wherein said timer means comprises a turbine mounted along said secondary outlet for rotation in response to fluid flow through said secondary outlet, electrical current generation means for generating an electrical current in response to turbine rotation, and a timer responsive to generation of current by said current generation means for generating said trigger signal at the conclusion of said predetermined time interval.

43. The flow control valve assembly of claim 42 wherein said current generation means comprises a circular arrangement of magnets mounted on said turbine in an array with alternating polarity, a pair of pole pieces disposed respectively on opposite axial sides of said turbine in relatively close association with said magnets, and an armature coil coupled to said pole pieces, said coil being further coupled to said timer.

44. The flow control valve assembly of claim 42 wherein said timer includes means for selecting the duration of said predetermined time interval.

45. The flow control valve assembly of claim 32 wherein said regulator valve includes means for sealing said secondary outlet against fluid flow from said valve inlet when said regulator valve is in the second operative state.

46. The flow control valve assembly of claim 32 wherein said primary outlet includes an outlet port, and wherein said regulator valve includes a valve head of tapered shape disposed partially within said port for modulating flow therethrough when said regulator valve is in the first operative position, said regulator valve further including a plurality of guide legs projecting at least partially into said port to guide movement of said regulator valve between said first and second operative states.

47. The flow control valve assembly of claim 32 including stop means for limiting the extension of said regulator spring upon movement of said spool to the unlatched position.

48. In a swimming pool filtration and cleaning system having a circulation pump for pumping pool water through a filter unit prior to return to the swimming pool, a flow control valve assembly for controlling and regulating water flow through a return conduit to the pool and to a water-powered in-the-pool cleaning device, comprising:

a valve inlet for receiving water under pressure from the pool filtration and cleaning system;

a primary outlet coupled to the return conduit;

a secondary outlet coupled to the in-the-pool cleaning device;

a regulator valve;

means for positioning said regulator valve in a first operative state permitting water flow through both said primary and secondary outlets and modulating water flow through said primary outlet to maintain water pressure at said secondary outlet at a predetermined and substantially constant pressure level for a predetermined time interval; and means for positioning said regulator valve in a second operative state at the conclusion of said predetermined time interval closing said secondary outlet to water flow and permitting substantially unobstructed water flow through said primary outlet.

49. The flow control valve assembly of claim 48 further including means for returning said regulator valve to said first operative state upon cessation of flow through said valve inlet.

50. A swimming pool filtration and cleaning system, comprising, in combination:

a circulation pump for pumping pool water through a filter unit prior to return to the swimming pool;

a water-powered in-the-pool cleaning device; and a flow control valve assembly for controlling and regulating water flow through a return conduit to the pool and to the cleaning device, said flow control valve assembly including:

a valve inlet for receiving water under pressure from the pool filtration and cleaning system;

a primary outlet coupled to the return conduit;

a secondary outlet coupled to the in-the-pool cleaning device;

a regulator valve;

means for positioning said regulator valve in a first operative state permitting water flow through both said primary and secondary outlets and modulating water flow through said primary outlet to maintain water pressure at said secondary outlet at a predetermined and substantially constant pressure level for a predetermined time interval; and means for positioning said regulator valve in a second operative state at the conclusion of said predetermined time interval closing said secondary outlet to water flow and permitting substantially unobstructed water flow through said primary outlet.

* * * * *

UNITED STATES PATENT AND TRADEMARK OFFICE
CERTIFICATE OF CORRECTION

PATENT NO. : 4,522,221

DATED : June 11, 1985

INVENTOR(S) : Donald R. Chivens et al.

It is certified that error appears in the above-identified patent and that said Letters Patent is hereby corrected as shown below:

Column 1, line 37, delete "time" and insert therefor --timer--.

Column 1, line 54, delete "vaccum" and insert therefor --vacuum--.

Column 6, line 29, delete "the" and insert therefor --and--.

Column 8, line 42, delete "inelt and insert therefor --inlet--.

Column 11, line 36, delete "the" (second occurrence) and insert therefor --a--.

Column 13, line 25, delete "respectivey" and insert therefor --respectively--.

Column 15, line 24, delete "fluid" and insert therefor --first--.

UNITED STATES PATENT AND TRADEMARK OFFICE
CERTIFICATE OF CORRECTION

PATENT NO. : 4,522,221

DATED : June 11, 1985

INVENTOR(S) : Donald R. Chivens et al

It is certified that error appears in the above-identified patent and that said Letters Patent is hereby corrected as shown below:

Column 15, line 36, delete "object" and insert therefor --outlet--.

Signed and Sealed this

Twenty-second Day of October 1985

[SEAL]

*Attest:*

*Attesting Officer*

DONALD J. QUIGG

*Commissioner of Patents and Trademarks—Designate*